United States Patent [19]
Lenney et al.

[11] Patent Number: 5,561,669
[45] Date of Patent: Oct. 1, 1996

[54] COMPUTER NETWORK SWITCHING SYSTEM WITH EXPANDABLE NUMBER OF PORTS

[75] Inventors: Mark A. Lenney, Santa Clara; Hon W. Chin, Palo Alto, both of Calif.

[73] Assignee: Cisco Systems, Inc., San Jose, Calif.

[21] Appl. No.: 330,074

[22] Filed: Oct. 26, 1994

[51] Int. Cl.⁶ ................................................. H04J 3/26
[52] U.S. Cl. ...................... 370/60.1; 370/67; 370/85.6; 370/85.7; 370/92; 370/105.2; 370/94.3; 340/825.51
[58] Field of Search ........................ 370/32, 24, 60.1, 370/40, 60, 82, 67, 100.1, 105.1, 85.1, 85.6, 105.2, 85.7, 91, 92, 94.1, 94.3, 95.2, 95.3, 95.1; 340/825.5, 825.51

[56] References Cited

U.S. PATENT DOCUMENTS

| | | | |
|---|---|---|---|
| 4,586,175 | 4/1986 | Bedard | 370/85.6 |
| 4,593,282 | 6/1986 | Acampora et al. | 370/85.6 |
| 4,621,362 | 11/1986 | Sy | 370/85.14 |
| 4,627,052 | 12/1986 | Hoare et al. | 370/85.13 |
| 4,706,081 | 11/1987 | Hart et al. | 370/85.13 |
| 4,809,265 | 2/1989 | Hart et al. | 370/85.13 |
| 4,811,337 | 3/1989 | Hart | 370/85.13 |
| 4,866,421 | 9/1989 | Szczepanek | 370/85.15 |
| 4,933,938 | 6/1990 | Sheehy | 370/85.13 |
| 4,979,100 | 10/1990 | Makris et al. | 364/200 |
| 4,987,571 | 1/1991 | Haymond et al. | 370/85.2 |
| 5,088,090 | 2/1992 | Yacoby | 370/85.13 |
| 5,107,492 | 4/1992 | Roux et al. | 370/85.6 |
| 5,274,631 | 10/1993 | Bhardwaj | 370/60 |
| 5,327,428 | 7/1994 | Van As et al. | 370/94.2 |
| 5,392,280 | 2/1995 | Zheng | 370/94.2 |
| 5,396,494 | 3/1995 | Roposh | 370/85.2 |

*Primary Examiner*—Benedict V. Safourek
*Assistant Examiner*—Seema S. Rao
*Attorney, Agent, or Firm*—Cesari and McKenna

[57] ABSTRACT

A switching fabric circuit that provides on-the-fly switching of packets, an expandable number of ports, and the interconnection of heterogeneous LAN segments. The switching fabric circuit includes a switching link that comprises a switching bus and a plurality of packet processors, wherein each packet processor is coupled between the switching bus and a LAN segment. The switching bus is a time division multiple access (TDMA) bus, and arbitration for switching bus access is distinct from arbitration for access to the ports of the switching fabric circuit. Switching bus arbitration is done according to one of two priority levels, wherein high priority requests are guaranteed access to the switching bus during a synchronization period in which the high priority requests are made. This provides for guaranteed throughput and on-the-fly switching of packets. Port arbitration may be either uniport port arbitration or multiport port arbitration. Port arbitration is characterized by the transmission of a POE mask by a source port to a destination port and by the subsequent transmission of a DPA signal by the destination port to the source port.

16 Claims, 9 Drawing Sheets

COMPUTER NETWORK SWITCHING SYSTEM WITH EXPANDABLE NUMBER OF PORTS

FIELD OF THE INVENTION

The present invention relates generally to local area networks and more specifically to switching fabric circuits for segmented networks.

BACKGROUND

Local area networks (LANs) provide for the interconnection of a multiplicity of endstations so that a multiplicity of users may share information in an efficient and economical manner. Each endstation of a LAN can typically communicate with every other endstation that is physically connected to that LAN.

As the number of endstations of a LAN increases, the effective throughput for each endstation of the LAN decreases. To increase the throughput for each endstation, the LAN can be "segmented" into smaller interconnected sub-networks or "LAN segments" that each have fewer endstations. The load for each sub-network of a segmented LAN is reduced, leading to increased throughput for a segmented LAN when compared to a similarly sized, unsegmented LAN.

Interconnection of the segments of prior segmented LANs is achieved by connecting several individual sub-networks to the ports of a "switching fabric circuit." The term "switching fabric circuit" as used here is meant to encompass any circuit that provides for the processing and forwarding of information between LAN segments in a segmented network. For example, one prior switching fabric circuit includes a number of conventional Ethernet bridges connected to a backbone network that is controlled by a system processor. The system processor is responsible for filtering and forwarding frames of data between LAN segments. Filtering and forwarding typically requires first storing incoming frames of data received from the ports and subsequently forwarding the frames of data to the appropriate destination port. One disadvantage of the filtering and forwarding schemes of prior bridging architectures is the delay time associated with the filtering and forwarding process.

To address this and other disadvantages of bridging architectures, a second prior switching fabric circuit commercially known as Etherswitch® was developed. Etherswitch® is sold by Kalpana, Inc., of Sunnyvale Calif., and described in U.S. Pat. No. 5,274,631, of Bhardwaj, issued on Dec. 28, 1993, entitled *Computer Network Switching System*. The Etherswitch® includes a number of packet processors, one for each port, that are each connected to multiplexor logic. The multiplexor logic acts as a crossbar switch that provides a direct physical connection between the packet processors of the source and destination ports. The multiplexor logic allows for packets to be transmitted directly from the packet processor of the source port to the packet processor of the destination port without first storing the packets. The process of forwarding a packet without first storing the packet is known as "switching on-the-fly."

Wherein on-the-fly switching provides significant speed advantages over other prior art switching fabric circuits, the use of the multiplexor logic effectively limits the number of ports of the switching fabric circuit. Because the multiplexor logic provides a physical connection between ports, the hardware of the multiplexor logic is designed to service a fixed number of ports, and providing additional ports to the multiplexor logic to allow for future expansion may be cost-prohibitive. For example, doubling the maximum number of ports typically results in squaring the complexity of the multiplexor logic, which greatly increases the cost of the multiplexor logic.

Further, each port is typically limited to only a portion of the total bandwidth for the switching fabric circuit by virtue of the physical link between the port and the multiplexor logic. For example, the total bandwidth for a ten port Etherswitch may be 100 Mb/s, wherein each port is provided 10 Mb/s of bandwidth. No port may request more than its 10 Mb/s of bandwidth. A port is therefore unable to use the unused bandwidth of idle ports to increase its individual throughput.

SUMMARY AND OBJECTS OF THE INVENTION

Therefore, one object of the present invention is to provide on-the-fly switching for a switching fabric circuit.

Another object of the invention is to provide a switching fabric circuit that allows for the cost-effective expansion of the number of ports of the switching fabric circuit.

Another object of the invention is to provide a switching fabric circuit that provides for the interconnection of heterogeneous LAN segments that operate at different data transfer rates.

Another object of the invention is to provide a single point where statistics regarding segmented network traffic may be gathered.

Another object of the invention is to allow the oversubscription of bandwidth for the switching fabric circuit, wherein more bandwidth may be requested than is available.

These and other objects of the invention are provided by a switching fabric circuit that comprises a plurality of ports. Each port is coupled to a corresponding one of a plurality of local area network (LAN) segments, wherein each LAN segment may operate according to a different LAN communications protocol. The switching fabric circuit also comprises a switching link coupled to the plurality of ports for interconnecting the LAN segments. The switching fabric circuit is for receiving requests for data transfer operations from the plurality of ports during a synchronization period, for prioritizing the requests for data transfer operations according to a high priority and a low priority during the synchronization period, and for granting requests for data transfer operations such that ports requesting data transfer operations at the high priority are guaranteed access to the switching link during the synchronization period and ports requesting data transfer operations at the low priority are provided access to the switching link for a remainder of the synchronization period.

The switching fabric circuit may operate according to a distributed arbitration scheme wherein port arbitration is distinct from switching bus arbitration. Therefore, a method for transferring data packet is provided. A first port requests control of the bus to transfer a data packet, and a central arbiter grants control of the bus to the first port. The first port transfers a port of exit mask via the bus. The port of exit mask indicates a second port as a destination of the data packet. The first port also transfers a source identification by the first port to identify the first port as the source port of the port of exit mask. In response to the port of exit mask, the second port requests control of the bus to transfer information to the first port indicating that the second port is ready to receive the system packet. The central arbiter grants control of the bus to the second port, and the second port transfers the information and the source identification to identify the first port as a destination of the first signal. Once the information is received, the first port may begin transfer of the system packet requesting access of the bus by the first port to transfer the system packet to the second port.

Multiport port arbitration may be distinct from uniport port arbitration. Therefore a method for transferring a multiple destination packet in the switching link of the switching fabric circuit is provided. A first packet processor having a multiple destination packet to transfer monitors the switching bus to determine when the switching bus is free. A counter maintains a count that indicates which of the plurality of packet processors of the switching link is a selected packet processor is incremented. Signal lines of the switching bus carry the count to indicate when the first packet processor is the selected packet processor. The first packet processor responds to being the selected packet processor by indicating that it has the multiple destination packet to transfer. The counter is stopped in response the first packet processor having the multiple destination packet to transfer. The first packet processor transmits a port of exit mask on the switching bus. The port of exit mask indicates which of the plurality of packet processors are destination packet processors for the multiple destination packet. When the destination packet processors are ready to receive the multiple destination packet, they indicate readiness to the first packet processor such that the first packet processor begins transferring the multiple destination packet. The counter is started in response to the destination packet processors indicating that they are ready to receive the multiple destination packet.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
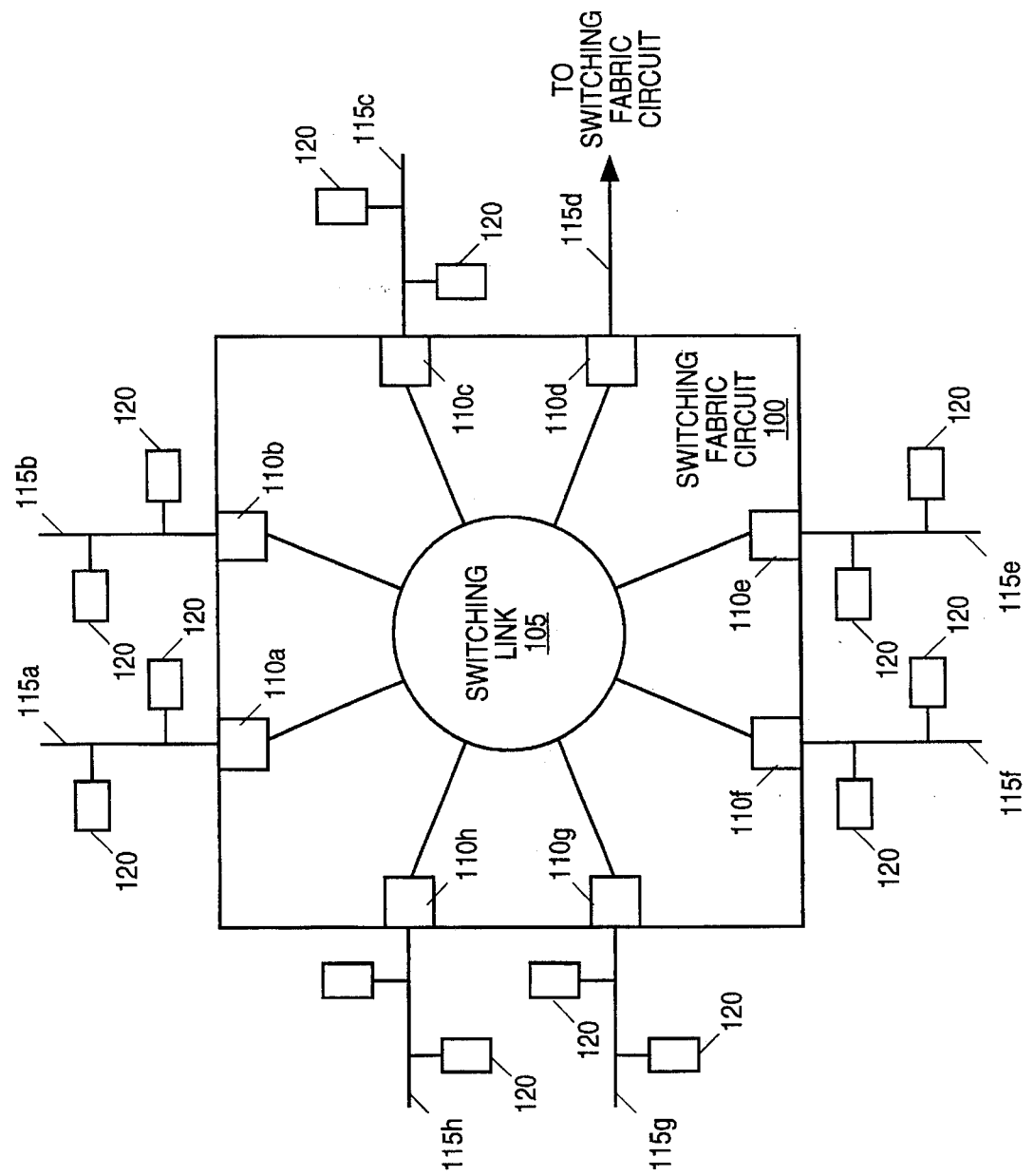
FIG. 1 shows a switching fabric circuit including a switching link according to one embodiment.

FIG. 1 shows a switching fabric circuit 100 that includes eight ports 110a–11h and a switching link 105. The switching link 105 is coupled to each of the ports 110a–110h and provides a communications path so that each port 110 may share information with every other port. As will be discussed, the architecture of the switching link 105 allows for on-the-fly switching, an expandable number of ports, and the interconnection of local area network (LAN) segments that may transfer data at different rates.

Each of the ports 110a–110h is coupled to a corresponding one of the LAN segments 115a–115h. For example, port 110a is coupled to LAN segment 115a, port 110b is coupled to LAN segment 115b, etc. Each LAN segment 115 comprises a data link such as a coaxial cable, twisted pair wire, or optical fiber, and the ports 110a–110h provide the appropriate electrical interface between the switching link 105 and the LAN segments 115a–115h.

LAN segments 115a–115h may each operat according to different LAN standards and protocols, and the switching fabric circuit 100 provides for rate matching so that communications may occur between LAN segments that operate according to different communications protocols. For example, LAN segments 115a–115e may operate according to the IEEE 802.3 10Base5 LAN standard, which is commonly known as Ethernet. The IEEE 802.3 10Base5 LAN standard provides for a transfer rate of 10 Mb/s. Alternatively, LAN segments 115a–115e may operate at 16 Mb/s according to the IEEE 802.5 Token Ring standard. LAN segments 115f and 115g may operate according to the 802.3 100BaseT Ethernet standard, which provides for a 100 Mb/s data transfer rate. Finally, LAN segment 115h may be an ATM network link that provides for data transfer at 150 Mb/s. The switching fabric circuit 100 may be configured to allow for LAN segments that operate according to any of a number of standard and non-standard communications protocols.

There may be one or more endstations 120 coupled to each LAN segment 115. Endstations are shown in FIG. 1 as small boxes coupled to the LAN segments 115. Alternatively, a LAN segment 115 may be provided as a link between the switching fabric circuit 100 and another switching fabric circuit (not shown). The switching fabric circuit 100 interconnects the endstations of the various LAN segments to form a segmented network. Typically, each of the endstations 120 coupled to the LAN segments 115a–115h has a unique address that is globally defined for the segmented network. Wherein the segmented network is subdivided into two or more virtual networks, addresses may be locally defined for each virtual network.

Communications between endstations that are coupled to the same LAN segment 115 may proceed without the switching fabric circuit 100; however, communications between endstations of different LAN segments necessarily involve the operation of the switching fabric circuit 100. An endstation that is the source of a data frame for transfer is called the "source endstation," and a port that receives a data frame for transfer to another port via the switching link 105 is called a "port of entry" or a "source port." An endstation that is the destination of a data frame is called a "destination endstation," and a port that receives a data frame via the switching link 105 is called a "port of exit" or a "destination port."

A data frame sent by an endstation typically includes both a source address field and a destination address field. The source address field contains the network address of the source endstation for the frame. The contents of the destination address field depends on the type of transaction. A "unicast" transaction is a network transaction in which the destination address field of the frame indicates a single destination endstation. Multicast and broadcast transaction protocols are defined by the LAN communications protocol of a LAN segment. For LAN segments that operate according to the IEEE 802 standards, a "multicast" transaction is a network transaction in which the destination address field of the frame contains a predefined multicast address according to IEEE standards, and a "broadcast" transaction is a network transaction in which the destination address field of the frame of a broadcast transaction is typically set to a default value that indicates the frame is to go to all endstations of the segmented network.

The switching link 105 monitors each data frame that is transferred on each LAN segment 115 and determines which data frames are broadcast frames, multicast frames, or unicast frames having a destination that is remote from the port of entry. These three types of data frames are directed to the appropriate port or ports of exit by the switching link 105. Unicast frames having destination endstations that are local to the port of entry are ignored by the switching link 105 except to the extent that such frames are used during the network learning process whereby the switching link 105 "learns" the address and location of each endstation that is coupled to the switching fabric circuit 100.

Figure 2:
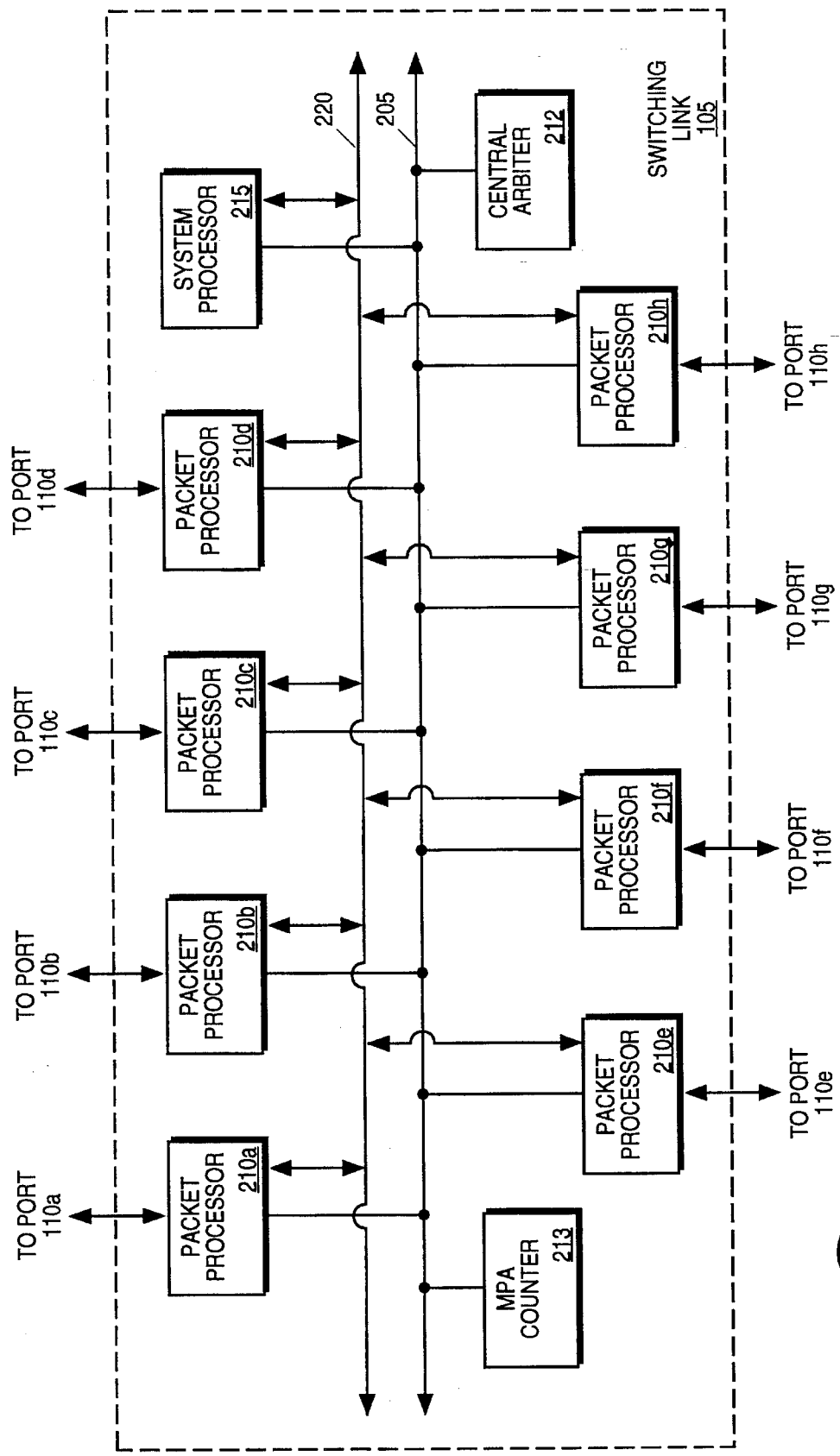
FIG. 2 shows the switching link of a switching fabric circuit in more detail.

FIG. 2 shows the switching link 105 in greater detail. Switching link 105 includes a switching bus 205, a multiplicity of packet processors 210a–210h, a system processor 215, a processor bus 220, a multiport arbitration ("MPA") counter 213, and a central arbiter 212. Each of the packet processors 210a–210h is coupled to a corresponding one of the ports 110a–110h. For example, packet processor 210a is coupled to port 110a, packet processor 210b is coupled to port 110b, etc. The packet processors 210a–210h provide the communications protocol interfaces between the LAN segments 115a–115h and the switching link 105.

Communications between ports 110 of the switching fabric circuit 100 are done using system packets, and the switching bus 205 is the mechanism by which system packets are transferred between the ports. System packets are LAN data frames that include the additional information required for forwarding the LAN data frames to the appropriate ports of the switching link 105. When a data frame is received from a LAN segment 115 via a port 110 (the port of entry), and that data frame is to be transferred to a remote port (the port of exit), the packet processor of the port of entry generates a system header that may be appended to the beginning of the data frame to create the system packet. The system header contains additional information that may provide additional forwarding options to the port of exit that the port of exit may use to determine the final disposition of the data frame. A system header may be used, for example, when the system packet is destined for a port of exit coupled to an ATM LAN segment. The system packet is transferred or "switched" via the switching bus 205 to the packet processor of the port of exit. When a system packet is received by a port of exit, the packet processor of the port of exit strips any system header from the system packet to retrieve the transmitted data frame.

System packets that include unicast data frames are called "unicast packets." Similarly, system packets that include multicast frames are called "multicast packets," and system packets that include broadcast frames are called "broadcast packets."

To determine whether a data frame received by a packet processor 210 from a port 110 is to be switched to a remote port by the switching bus 205, each packet processor 210 includes a filter table that contains entries for each known endstation of the segmented network. Each packet processor performs lookups of the filter table using the destination address field of the received data frame and creates a system packet to forward the data frame if the data frame specifies a remote destination endstation. The system processor 215 maintains a master filter table for the switching fabric circuit and updates the local filter tables of each of the packet processors via the processor bus 220. Entries may be added to the filter tables automatically using a bridge learning process. Alternatively, a system administrator may provide master filter table entries for each endstation of the segmented network.

Each of the packet processors 210 and the system processor 215 may use the switching bus 205 to transfer system packets to each other. Typically, system packets are switched from the packet processors 210 to the system processor 215 during the network learning process or when a port does not otherwise know the destination endstation specified by the destination address field of the data frame. The system processor 215 uses the packets that are forwarded to it via the switching bus 205 to build the master filter table for the switching fabric circuit 100.

The transmission of a system packet is preceded by the transmission of a port of exit (POE) mask that comprises a number of bits equal to one more than the maximum number of ports for the switching fabric circuit 100. A POE mask bit is provided for each port and for the system processor. Each packet processor 210 monitors the switching bus 205 to determine if the bit of the POE mask that indicates the port to which the packet processor is coupled is set to a logic high level. If the bit that indicates the port of the packet processor is set to a logic high level, the packet processor of that port recognizes that it is a port of exit for the system packet. If the bit that indicates the port is set to a logic low level, the packet processor for that port may ignore the system packet because the port is not a port of exit for the system packet. The POE mask for a system packet may be retrieved from the local filter table during the look-up performed by the source packet processor to determine the location of the destination endstation.

As described, system packets are switched between the ports using the switching bus 205, and the central arbiter 212 is coupled to the switching bus 205 for arbitrating requests made by the packet processors 210 to access the switching bus 205. The switching bus 205 includes one request signal line (REQ) and one acknowledge signal line (ACK) for the system processor 215. The switching bus 205 also includes one REQ signal line and one ACK signal line for each packet processor that may be coupled to the switching bus 205. All of the REQ signal lines and the ACK signal lines are coupled directly between the central arbiter 212 and the corresponding system or packet processor. For example, there may be a total of thirty-two sets of REQ and ACK signal lines although only nine sets, eight for the packet processors and one for the system processor, may actually be used. Therefore, more packet processors may be added to the switching link 105, and the number of ports for the switching fabric circuit 100 may increase accordingly.

Because all communications between LAN segments use the switching bus 205, the switching bus 205 may be conveniently used to gather information regarding the bandwidth usage of each LAN segment or endstation. This information may be used to meter usage of the switching fabric circuit 100. The switching bus 205 also provides for the convenient expansion of the total number of ports at a reduced cost when compared to the multiplexor logic of the prior system.

The switching bus 205 is a partially asynchronous time division multiple access (TDMA) bus that includes a 32-bit data bus for transferring data between the system and packet processors. Data transfer on the switching bus 205 occurs during discrete periods of time called "synchronization periods," each of which is subdivided into a multiplicity of bus slots, wherein each bus slot is equal to one bus clock cycle. The switching bus 205 shown in FIG. 2 operates at a 16.25 MHz clock speed and fifty-two bus slots are provided per synchronization period such that the total duration of the synchronization period is equal to 3.2 microseconds. Thirty-two bits of data may be transferred each clock cycle such that the maximum bandwidth for the switching bus of this embodiment is 520 Mb/s. Of course, the maximum bandwidth increases as the system clock speed increases, as the width of the data bus increases, or as the number of data transfers per clock cycle increases.

The central arbiter 212 dynamically allocates bandwidth for the switching bus 205 according to two levels of priority: high priority and low priority. High priority transactions are guaranteed access to the switching bus 205 (guaranteed bandwidth) so that high priority packets may be switched on-the-fly. All other transactions are assigned low priority. According to one embodiment of the switching bus 205, high priority transactions are reserved for transactions between 10 Mb/s LAN segments. Each packet processor 210 includes circuitry for determining whether its request to transfer a particular system packet is a high priority request or a low priority request. This is discussed in more detail below.

Dynamic bus slot allocation may be performed in a number of different ways. According to a first method, the central bus arbiter 212 allocates bus slots to requesting packet processors after access requests are received, and no packet processor has a dedicated bus slot. The number of bus slots in a synchronization period is chosen to be great enough to provide guaranteed access to each packet processor, as if all the packet processors could initiate high priority transactions. According to a second method, bus slots are initially allocated to each packet processor and deallocated if a packet processor does not request a high priority bus access. The order in which a packet processor may access the switching bus is altered when bus slots are deallocated such that all high priority transactions occur in a single block of contiguous bus slots. The second method may not require a central arbiter. Both of these methods may be contrasted with typical prior time division multiplexed (TDM) buses wherein each component coupled to the bus has a dedicated bus slot. If the dedicated bus slot is unused, the TDM bus is idle for that bus slot.

As mentioned previously, all high priority requests are granted in the synchronization period in which they are made. Thus, high priority bus traffic is transferred synchronously, and the number of bus slots is equal to at least the number of high priority requests that be made per synchronization period. Any remaining bus slots of the synchronization period are used for low priority transactions. According to the present embodiment, each high priority transaction of a synchronization period is provided one bus slot for data transfer, and each low priority transaction competes for as many slots that are required the next synchronization period begins.

The width of the data bus, the duration of the synchronization period, and the guaranteeing of bus access for all high priority transactions during each synchronization period combine to provide a guaranteed throughput for high priority transactions, which allows for high priority system packets to be switched on-the-fly such that the port of entry packet processor may begin transfer of a system packet before the entire data has been received from the LAN segment. Wherein the data bus is thirty-two bits wide, the synchronization period is 3.2 microseconds, and one bus slot is provided per synchronization period, a throughput of 10 Mb/s is guaranteed, and on-the-fly switching between two 10 Mb/s LAN segments may occur. To guarantee a throughput of 16 Mb/s, the duration of the symchronizations period may be reduced to 2 microseconds if the width of the bus and the number of bus slots guaranteed per synchronization period remain constant.

TABLE 1

SWITCHING BUS SIGNAL LINES

| Signal Name | Qty. | Type | Definition |
| --- | --- | --- | --- |
| DATA[31:0]:H | 32 | Slot driven Tri-state | DATA[31:0] signals carry packet data during data transmission slots, and Port Of Exit mask during arbitration slots. |
| SYNC:L | 1 | Single driver Push-pull | SYNC signal indicates the beginning of a sync period. It is asserted for one bus clock every 3.2 usec (microseconds), not used. |
| PRIORITY1:L | 1 | Multi driver OC | Packet processors drive this line during bus requests for high priority traffic. |
| REQ(x):L | 1 | 1 per port | This is the request signal line from the packet processor to the bus arbiter. |
| ACK(x):L | 1 | 1 per port | This is the acknowledge line from the bus arbiter to the packet processor. |
| TYPE[2:0]:H | 3 | Slot driven Tri-state | TYPE signals indicate what type of information is driven on the DATA[31:0] signals during the current clock cycle. |
| SID[4:0]:H | 5 | Slot driven | Source ID. Indicates source of frame. Driven by source port during POE and DATA type bus cycles, and driven by destination port during DPA type bus cycles. |
| BE[1:0]:H | 2 | Slot driven Tri-state | During the last data transfer slot BE[1:0] indicate the number of valid bytes. During POE, indicates rate and whether the packet is multicast or unicast. |
| MPA[4:0]:H | 5 | Single driver Push-pull | MPA[4:0] indicates the port address of the packet processor port that is allowed to instigate a multiport arbitration |
| BFREE:H | 1 | Multi drivers Wired-or | BFREE is asserted when no arbitration is occurring on the switching bus. This signal is a wired-or signal |

TABLE 1-continued

SWITCHING BUS SIGNAL LINES

| Signal Name | Qty. | Type | Definition |
|---|---|---|---|
| | | | that is pulled low by any source port that is currently asserting a POE. |
| BBUSY:L | 1 | Multi drivers Wired-or | BBUSY is asserted when a destination port addressed by a multiport POE is currently receiving a packet. |
| BFREEZ:L | 1 | Slot driven Tri-state | BFREEZ is asserted to indicate a source packet processor is currently arbitrating for transmission of a multiport packet. |
| RESET:H | 1 | Single driver Push-pull | RESET is a synchronous signal used to reset all packet processors and synchronize all internal clocks. |
| CLK:H | 1 | Single driver Push-pull | CLK is a 32.5 MHz clock that is used by all packet processors to synchronize to the switching bus. |

Table 1 shows the signal definition for the signal lines of the switching bus 205 shown in FIG. 2. As mentioned previously, the switching bus 205 includes 32 data bus signal lines, DATA[31:0]. Three "type" signal lines TYPE[2:0] are provided to each of the system and packet processors to indicate what type of information is currently being driven on the data bus during the bus slot. The $\overline{\text{SYNC}}$ signal line is provided to each of the system and packet processors to indicate the beginning of a synchronization period when the $\overline{\text{SYNC}}$ signal is asserted logic low.

The RESET and CLK signals are provided to each of the packet processors. The packet processors include internal clock circuitry for deriving their own internal 16.25 MHz clock signals using the RESET and CLK signals. The internal clock circuits of the packet processors are designed to reduce clock skew between packet processors. The packet processors may also use the SYNC signal to synchronize the internal clock circuits.

Arbitration for unicast transactions ("uniport arbitration") is distributed, which means that arbitration for access to the switching bus 205 ("switching bus arbitration") is distinct from arbitration for access to a particular destination port ("port arbitration"). Switching bus arbitration is the process whereby a port requests and is granted access to the switching bus. Port arbitration is the process whereby a source port sends the POE mask and waits for the DPA signal from the destination port so that the source port may begin transmission of a system packet to the destination port. Each port must successfully complete switching bus arbitration before it is allowed to initiate port arbitration. Further, once a source port has successfully arbitrated for access to the destination port, the source port continues to initiate switching bus arbitration each synchronization period to transfer the system packet.

The $\overline{\text{SYNC}}$, $\overline{\text{PRIORITY1}}$, $\overline{\text{REQ}}$, and $\overline{\text{ACK}}$ signal lines are used primarily for switching bus arbitration. Signal lines

TABLE 2

| Type | Type field | BE | Notes |
|---|---|---|---|
| | 210 | 10 | |
| IDLE | 111 | — | (Sourced by separate active driver) |
| POE | 110 | 11 | Fast, multicast |
| POE | 110 | 10 | Fast, unicast |
| POE | 110 | 01 | Slow, multicast |
| POE | 110 | 00 | Slow, unicast |
| HEADER | 101 | — | |
| DATA | 100 | — | |
| EOP/CRC good | 011 | xx | BE = # of valid bytes |
| EOP/CRC bad | 010 | xx | BE = # of valid bytes |
| DPA | 001 | — | |
| DPOV | 000 | — | |

Table 2 shows the data types for the 32-bit data bus as may be indicated by the TYPE[2:0] signal lines. The TYPE[2:0] signal lines are asserted by the packet processor that has control of the switching bus 205 during the bus slot in which data is being transferred by the packet processor on the 32-bit data bus. The TYPE signal lines are discussed in more detail below.

Returning to Table 1, the $\overline{\text{PRIORITY1}}$ signal line is a wired-OR signal line that is driven active (logic low) when a packet processor requests a high priority transaction. The $\overline{\text{PRIORITY1}}$ signal line remains active as long as there is an outstanding high priority request. When the last high priority request is serviced, the $\overline{\text{PRIORITY1}}$ signal line goes inactive, and low priority arbitration may begin. Once the $\overline{\text{PRIORITY1}}$ signal goes inactive, it may not be asserted again until the next synchronization period.

SID[4:0], BE[1:0], DATA[31:0], TYPE[2:0] may be used for port arbitration. The SID[4:0] signal lines indicate the source ID of the source port that is currently driving data on the DATA[31:0] signal lines. Each of the packet processors 210 includes circuitry for arbitrating port access requests. This circuitry generally comprised of a latch that latches the contents of the SID[4:0] signal lines when the packet processor is free to accept a request. By latching the source ID of the source port of a system packet, the packet processor lock out all other packet processors until transmission of the system packet is complete, at which time the latch is cleared. Port access requests may be queued by the destination port, wherein the queue is cleared at the beginning of each synchronization period. To better ensure fairness, port accesses may be granted in a round robin manner, and high speed requesters (e.g. 100 Mb/s or 150 Mb/s packet processors) may be given priority over low speed requesters (e.g. 10 Mb/s packet processors) by low speed ports.

During transfer of the POE mask, the BE[1:0] signal lines are used to indicate the rate of the data transfer on the DATA[31:0] signal lines such that the packet processor of the port of exit may determine the rate matching rules that are applicable to the date of transfer. The TYPE[2:0] signals indicate what type of information is driven on the DATA [31:0] signal lines during the current clock cycle.

Port arbitration for multicast and broadcast transactions ("multiport port arbitration") is distinct from uniport port arbitration. According to one embodiment of the switching link 105, multiport port arbitration is postponed until all uniport port arbitration has concluded. Multiport port arbitration is the process whereby a source port having a multiport packet arbitrates for access to the destination ports of the multiport packet. Once multiport port arbitration has successfully completed, transfer of the multiport packet is done using switching bus arbitration.

To provide for multiport port arbitration the switching bus 205 includes signal lines MPA[4:0], BFREE, $\overline{\text{BBUSY}}$, and $\overline{\text{BFREEZ}}$. For the present embodiment, only one port is allowed to arbitrate for a multiport transaction during a synchronization period. Alternatively, multiple ports may be allowed to initiate multiport arbitration simultaneously. The BFREE signal line is provided to indicate when uniport arbitration has completed so that multiport port arbitration may begin. The MPA [4:0] signal lines are coupled to the MPA counter 213 and are provided to select the packet processor of the switching fabric circuit 100 that is allowed to initiate multiport port arbitration. The MPA counter 213 is incremented every two bus clock cycles unless the MPA counter 213 is disabled. The output of the MPA counter 213 is carried by the MPA[4:0] signal lines. The $\overline{\text{BFREEZ}}$ signal line is provided to signal the beginning of multiport arbitration to all ports and to disable the MPA counter 213.

If the packet processor indicated by the MPA[4:0] signal lines has a multiport transaction and either uniport port arbitration has completed or a predetermined amount of time has elapsed, that packet processor is allowed to arbitrate for access to the destination ports of exit. Optionally, a packet processor may begin multiport arbitration immediately upon being indicated by the MPA[4:0] signal lines. $\overline{\text{BFREEZ}}$ goes active (logic low) to freeze the value carried on the MPA [4:0] signal lines. The $\overline{\text{BBUSY}}$ signal line is provided so that ports of exit of the multiport system packet can indicate when they are ready to receive the multiport system packet. The multiport packet may be transferred to all of the ports of exit indicated the multiport POE mask when all of the packet processors are ready to receive the multiport system packet.

Before describing switching bus transactions in detail, rate matching methodology that may be used by the switching link 105 will be discussed. The packet processors 210 of the switching link 105 include receive queues for single file queuing of data frames, which requires that data frames received from the LAN segments must be able to leave the receive queue at least as fast as they enter the receive queue. Similarly, the packet processors 210 include transmit queues for single file queuing of system packets, which requires that system packets received from the switching bus 205 must be able to leave the transmit queue at least as fast as they enter the transmit queue. The receive and transmit queues of a packet processor may generally comprise first-in-first-out buffers (FIFOs).

Several rate matching rules may be derived from the queuing requirements. A first rate matching rule is that a unicast packet is switched between two ports at the rate of the faster of the two ports, wherein the rate of the port is defined by the rate of the associated LAN segment 115. A second rate matching rule is that a multicast packet is switched at the rate of the faster of the source port or the fastest destination addressed by the multicast packet. A third rate matching rule that follows from the first two rate matching rules is that all packet processors 210 must be able to send and receive data at the fastest rate supported by the switching fabric circuit 100.

To prevent system-wide queue delays due to half duplex bus interfaces, a fourth rate matching rule is that all packet processors that are coupled to LAN segments having the fastest rate must be capable of full duplex communication such that they are able to both send and receive simultaneously at the fastest rate. A fifth rate matching rule similarly requires that all packet processors coupled to the slowest rate LAN segments are able to send and receive at the slowest rate simultaneously. To reduce system costs, packet processors coupled to the slowest rate LAN segments need not be able to simultaneously send and receive at the fastest rate. The rules as applied to one implementation are shown in Tables 3 and 4.

TABLE 3

UNIPORT RATE MATCHING

| Port of Entry Lan Type | Port of Exit Lan Type | Bus Switching Rate | Port Of Entry Packet Processor's Capability To Receive (Mb/s) | Port Of Exit Packet Processor's Capability To Transmit (Mb/s) |
|---|---|---|---|---|
| 10 Mb/s | 10 Mb/s | 10 Mb/s | Rx from any | Tx to any |
| 10 Mb/s | 100 Mb/s | 170 Mb/s | Rx from 10's only | Tx to any |
| 10 Mb/s | 150 Mb/s | 170 Mb/s | Rx from 10's only | Tx to any |
| 100 Mb/s | 10 Mb/s | 170 Mb/s | Rx from any | Tx to 10 only |
| 100 Mb/s | 100 Mb/s | 170 Mb/s | Rx from any | Tx to any |
| 100 Mb/s | 150 Mb/s | 170 Mb/s | Rx from any | Tx to any |
| 150 Mb/s | 10 Mb/s | 170 Mb/s | Rx from any | TX to 10 only |
| 150 Mb/s | 100 Mb/s | 170 Mb/s | Rx from any | Tx to any |
| 150 Mb/s | 150 Mb/s | 170 Mb/s | Rx from any | Tx to any |

TABLE 4

MULTIPORT RATE MATCHING

| Port of Entry Lan Type | Ports Of Exit Lan Types | Bus Switching Rate |
|---|---|---|
| 10 Mb/s | 10 Mb/s only | 10 Mb/s |
| 10 Mb/s | Any 100 Mb/s | 170 Mb/s |
| 10 Mb/s | Any 150 Mb/s | 170 Mb/s |

TABLE 4-continued

MULTIPORT RATE MATCHING

| Port of Entry Lan Type | Ports Of Exit Lan Types | Bus Switching Rate |
| --- | --- | --- |
| 100 Mb/s | 10 Mb/s, 100 Mb/s, or 150 Mb/s | 170 Mb/s |
| 150 Mb/s | 10 Mb/s, 100 Mb/s, or 150 Mb/s | 170 Mb/s |

As shown in Tables 3 and 4, the switching bus operates at one of two rates for any given transaction although the LAN segments themselves may operate at three different rates. The slowest rate of the LAN segments for the embodiment shown in FIG. 2 is 10 Mb/s and the fastest rate is 150 Mb/s. The switching bus 205 is configured to switch system packets at either the slowest or the fastest rates. Packet processors that are coupled to LAN segments that operate at other than the slowest bus switching rate completely store a frame received as a system packet from the switching bus before beginning transmission of that frame to the LAN segment. This is required to prevent FIFO underflow due to possible insufficient bandwidth availability on the bus. It is apparent that the particular rate matching methodology is affected by the system architecture, and the precise rate matching methodology may differ for different system architectures.

Figure 3A:
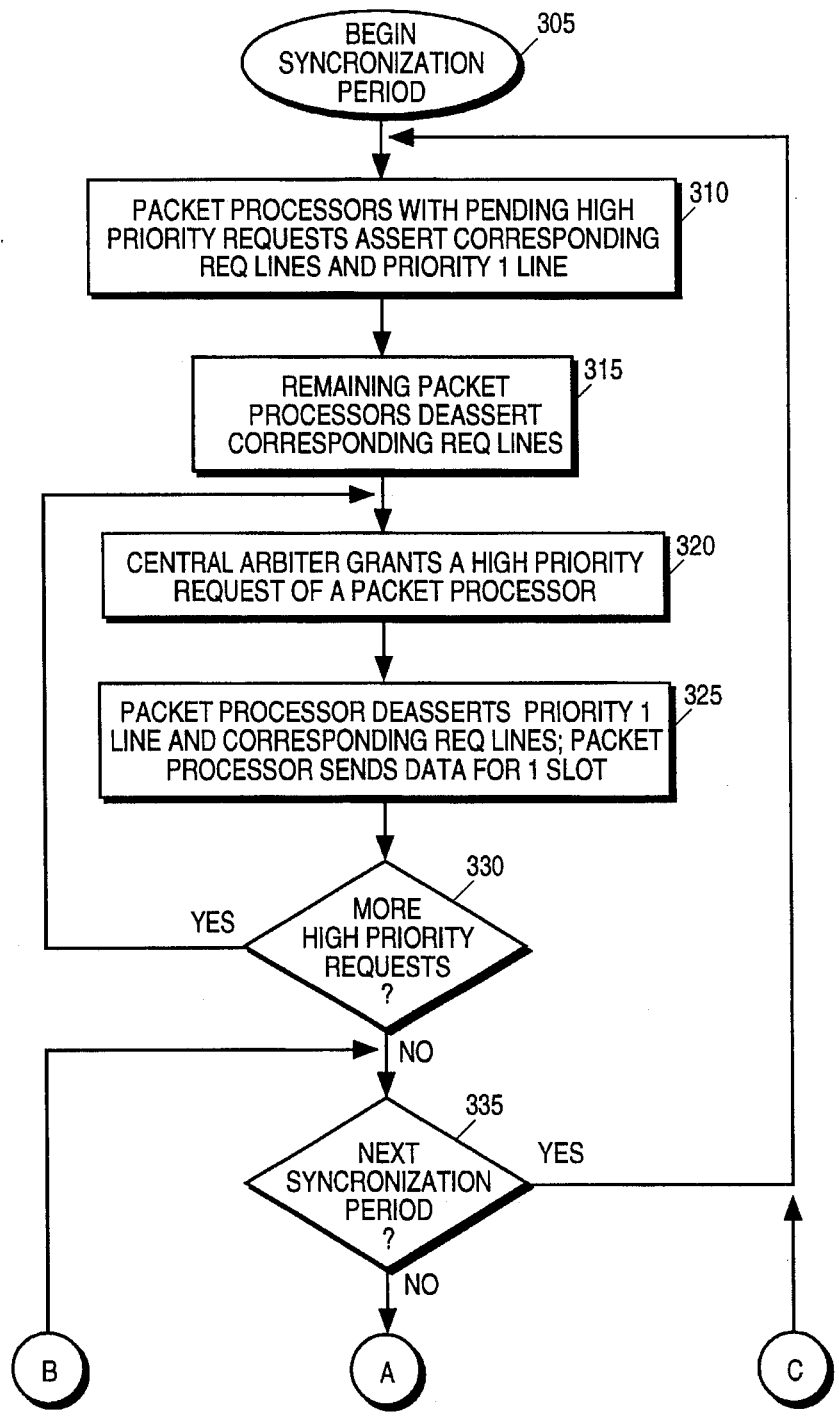
FIGS. 3a and 3b are a flow chart showing a switching bus arbitration method.
Figure 3B:
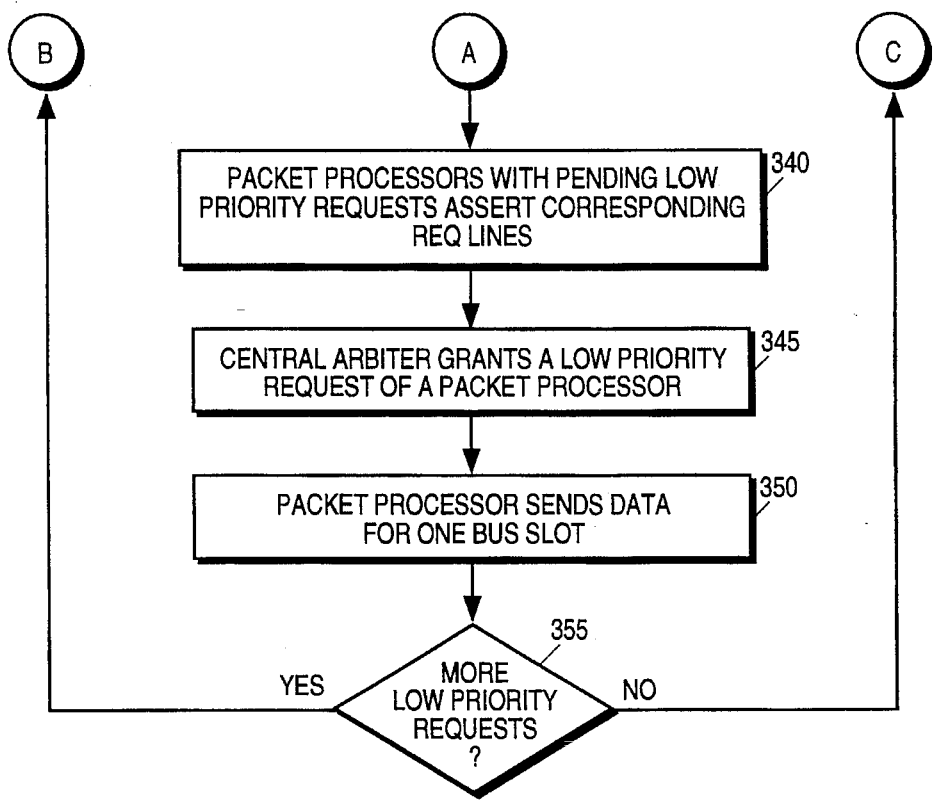

The operation of the switching bus 205 will now be described with reference to FIGS. 3a and 3b, which show a flow diagram for a method of operation for the switching bus 205. More specifically, the flow diagram of FIGS. 3a and 3b show a process for arbitrating for access to the switching bus 205. A synchronization period begins at process block 305 when the $\overline{\text{SYNC}}$ signal line is asserted (logic low). At process block 310, packet processors with pending high priority requests each assert the common $\overline{\text{PRIORITY1}}$ signal line and its corresponding $\overline{\text{REQ}}$ signal line by driving both signal lines logic low. The table entries of the filter table for each packet processor include a field that may be used to determine whether a particular request is a high priority or a low priority request. In this manner, each packet processor knows what priority request it has. At process block 315, any remaining packet processors that do not have a high priority transaction request deassert their corresponding $\overline{\text{REQ}}$ signal lines. Process blocks 310 and 315 preferably occur within the first bus slot of the synchronization period.

As discussed previously, each packet processor that requests a high priority bus access is guaranteed switching bus access during the synchronization period in which the high priority request is made. At process block 320, the central arbiter grants a high priority request of a packet processor. The packet processor that receives the grant from the central arbiter 212 deasserts the $\overline{\text{PRIORITY1}}$ signal line and its corresponding request line, sends data via the data bus for one bus slot of the synchronization period, and asserts the TYPE[2:0] signal lines to indicate what type of data is being sent on the DATA[31:0] signal lines. If there are any remaining high priority requests at process block 330, process blocks 320 and 325 are repeated until no high priority requests remain. According to the present embodiment, the central arbiter grants high priority requests on a round-robin basis.

The end of high priority arbitration is signaled by the $\overline{\text{PRIORITY1}}$ signal line going inactive (logic high), which occurs during the bus slot in which the packet processor having the last remaining high priority request is granted control of the switching bus 205. Depending on the LAN segments 115 coupled to the switching fabric circuit 100, it is possible that an entire synchronization period will be used to accommodate only high priority transactions. If the $\overline{\text{SYNC}}$ signal is asserted at process block 335 after the last high priority transaction has completed, the switching bus arbitration process begins again at process block 310. Otherwise, the process continues at process block 340.

After the $\overline{\text{PRIORITY1}}$ signal line goes inactive, the packet processors with pending low priority requests assert the their corresponding $\overline{\text{REQ}}$ signal lines at process block 340. Low priority request may be made at any time during the synchronization period after high priority transactions have completed. At process block 345, the central arbiter 212 grants a low priority request of a packet processor, which, at process block 350, transfers data via the switching bus 205 for a single bus slot. As low priority requests are reserved for bulk data transfers by high speed ports, packet processors typically request several bus slots per synchronization period. To ensure some fairness in bus access, low priority bus requests are granted on a round-robin, slot-by-slot basis such that no packet processor transfers data for two contiguous bus slots. If bus slots remain in the current synchronization period, it is determined at process block 355 whether there are additional low priority requests. If so, process blocks 335–350 are repeated. If not, the switching bus 205 may be idle until the next synchronization period at which time the switching bus arbitration process is repeated beginning at block 310.

Figure 4:
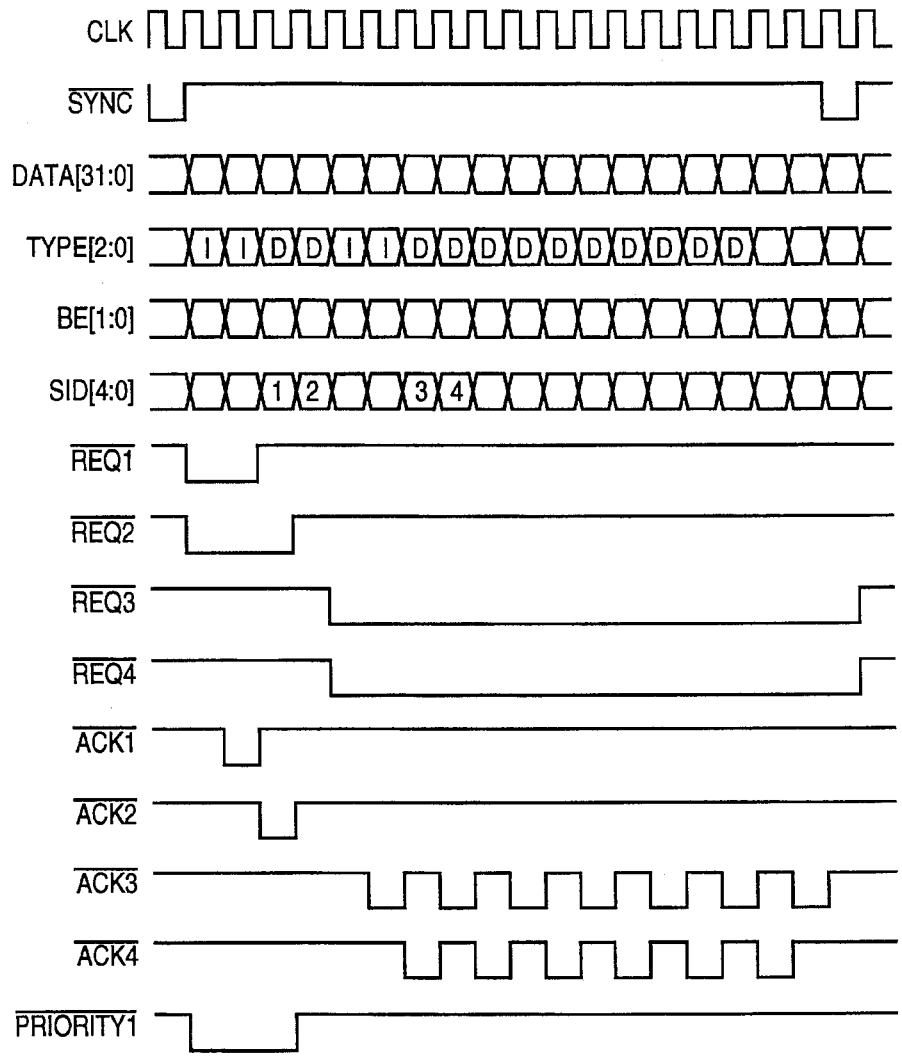
FIG. 4 is a timing diagram showing switching bus arbitration according to the method shown in FIGS. 3a and 3b.

FIG. 4 is a timing diagram showing an example of the operation of the switching bus 205 according to the process shown in FIG. 3. The length of the synchronization period for the example has been reduced to simplify the explanation. As shown, the SYNC signal is asserted low for a single bus cycle to signal the beginning of the synchronization period. During the first slot of the synchronization period a first a second packet processor each request high priority bus transactions, as indicated by the corresponding $\overline{\text{REQ1}}$ and $\overline{\text{REQ2}}$ and $\overline{\text{PRIORITY1}}$ signal lines going active. The central arbiter 212 grants the request of the first packet to begin data transfer during the second bus slot of the synchronization period as indicated by the ACK1 signal line being asserted low. In the bus cycle Following the receipt of the bus grant, the first packet processor deasserts its request line $\overline{\text{REQ1}}$, deasserts the $\overline{\text{PRIORITY1}}$ signal line, and drives the data on the DATA[31:0] signal lines. During the same bus slot, which is the third bus slot of the synchronization period, the first packet processor drives the TYPE[2:0] signal lines to indicate the data type and the SID[4:0] signal lines to indicate the source port of the data carried by the data bus. If the data type is a POE mask, the BE[1:0] signal lines are driven by the first packet processor to indicate the transfer rate. If the data type is EOP (end of packet), the BE[1:0] signal lines are driven by the first packet processor to indicate the number of valid bytes in the last data word.

The $\overline{\text{PRIORITY1}}$ signal line remains active after the first packet processor is granted control of the switching bus because the high priority request of the second packet processor remains pending. The central arbiter may grant one high priority request for each bus slot that follows the initial bus slot during which high priority requests were entered. Therefore, the central arbiter 212 is shown as granting control of the switching bus 205 to the second packet processor in the bus slot immediately following the bus slot in which the first packet processor was granted access to the switching bus 205. In the fourth bus slot of the synchronization period, the second packet processor drives its data over the data bus, and the $\overline{\text{PRIORITY1}}$ signal line is deasserted. During the same bus slot, the second packet processor drives the TYPE[2:0] signal lines, the BE[1:0] signal lines, and the SID[4:0] signal lines.

The third and fourth packet processors detect the lack of high priority arbitration during the fifth bus slot, and both packet processor request low priority access to the switching bus 205 during the sixth bus slot of the synchronization period. The $\overline{\text{PRIORITY1}}$ signal line remains inactive to indicate a low priority request. Low priority transactions are reserved for those transactions requiring multiple bus slots, and packet processors that request low priority transactions may request multiple bus slots during the same synchronization period and may pipeline those requests such that they may receive bus grants as often as every two bus slots. The central arbiter allocates bus access a single slot at a time in around-robin manner such that each packet processor is provided one bus slot at a time and such that no packet processor transfers data during two continuous bus slots. This is shown in FIG. 4 by the interleaving of bus grants for the third and fourth packet processors.

Figure 5:
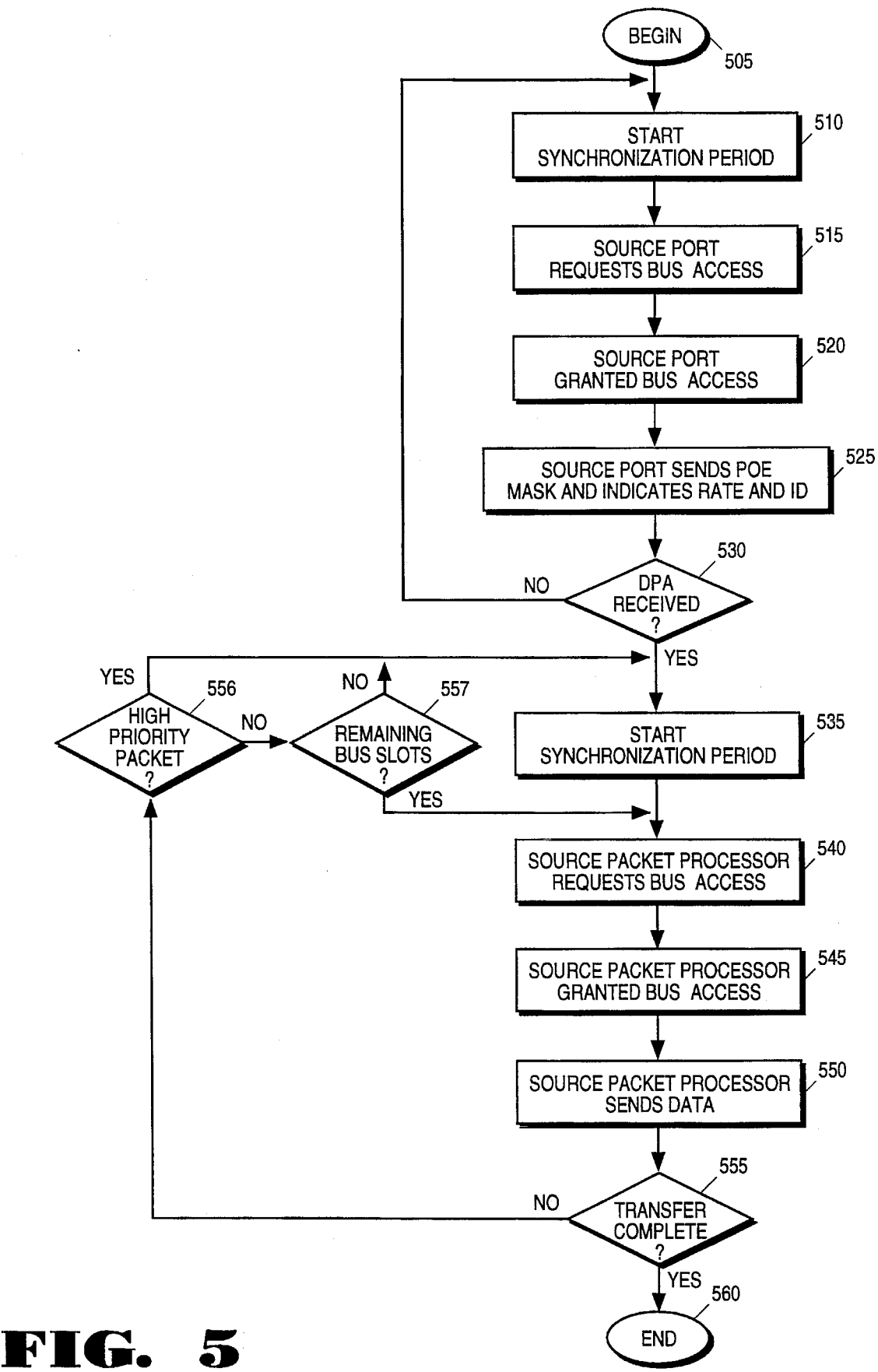
FIG. 5 is a flow chart showing a uniport port arbitration method as performed by a source packet processor.

FIG. 5 is a flow chart showing generally a method for uniport port arbitration. The process begins at process block 505. At process block 510, the synchronization period is begun by the $\overline{\text{SYNC}}$ signal being asserted for the duration of a single bus clock cycle. The packet processor of source port (the "source packet processor") requests access to the switching bus access at process block 515. The bus access requested may be of either a high priority or a low priority. The source port is granted bus access at process block 520. As shown at process block 525, when the source packet processor is initially granted bus access to transfer a system packet via the switching bus 205, the source packet processor sends a POE mask via the data bus, indicates that the data bus carries the POE mask by asserting the TYPE[2:0] signal lines as indicated in Table 1, indicates the rate of switching to the destination port by signaling via the BE[1:0] signal lines, and identifies itself as the source port of the POE mask by signaling via the SID[4:0] signal lines.

Whether the transaction is high priority or low priority, the source packet processor cannot continue transfer of the system packet until the packet processor of the destination port (the "destination packet processor") indicates that it is ready to receive the system pocket. For high priority transactions, the earliest that the destination packet processor can indicate that it is ready to receive the system packet is the synchronization period immediately following the initial synchronization period in which the source packet processor transmits the POE mask because the destination packet processor must itself arbitrate for bus access so that it may indicate that it is ready to receive the system packet. For low priority transactions, it is possible for the destination packet processor to indicate it is ready to receive the system packet in the same synchronization period that it receives the POE mask. The destination packet processor indicates that is available by simultaneously asserting the "destination port available" (DPA) signal via the TYPE[2:0] signal lines and asserting the SID[4:0] signal lines with the identification of the source packet processor. In this manner, the source packet processor recognizes that the destination port is available.

The source packet processor requests access to the switching bus once every synchronization period to transmit the POE mask until the destination port available (DPA) signal is received. Process block 530 shows that if a DPA signal is not received during the current synchronization period, the source packet processor repeats process blocks 510–525 until the DPA signal is received. The DPA signal is asserted by the port of exit according to the process shown in FIG. 6. Thus, after the initial synchronization period when the POE mask was initially transmitted, it is possible for the source packet processor to send the POE mask and recieve the DPA signal in the same synchronization period. If the DPA signal is received from the destination packet processor, the source packet processor may begin transfer of the system packet at the next synchronization period.

The transfers of a POE mask and the DPA signal each take only a single bus slot, and it is possible to assign high priority to POE mask and DPA signal transfers. According to the present embodiment, however, the priorities of the POE mask and DPA signal transfers are assigned according to the relative rates of the source and destination packet processors as described above. Thus, the POE masks and DPA signals of high priority system packets are also high priority transactions requiring high priority bus access requests.

After the DPA signal is received, the process continues at process block 535, when the next synchronization period begins. The source packet processor requests switching bus access at process block 540. At process block 545, the source packet processor is granted access, and at process block 550, the source packet processor sends data via the DATA[31:0] signal lines. The source packet processor indicates the type of data the DATA[31:0] by toggling the type signal lines. If the transfer is not complete at process block 555 and the transaction is a high priority transaction as determined at process block 556, process blocks 535 through 550 are repeated until transfer is complete, at which time the process ends at process block 560. If the transfer is not complete at process block 555, the transaction is a low priority transaction as determined at process block 556, and bus slots of the current synchronization period remain to be allocated as determined at process block 557, steps 540–550 are repeated to the extent g bus traffic allows the central arbiter 212 to allocate bus slots to that source packet processor. If the transfer is not complete at process block 555, the transaction is a low priority transaction as determined at process block 556, and no bus slots of the current synchronization period remain to be allocated as determined at process block 557, process blocks 535–550 are repeated. Once the DPA signal is received, uniport port arbitration is complete, and process blocks 535–550 are simply the switching bus arbitration method of FIGS. 3a and 3b shown in a simplified form.

Figure 6:
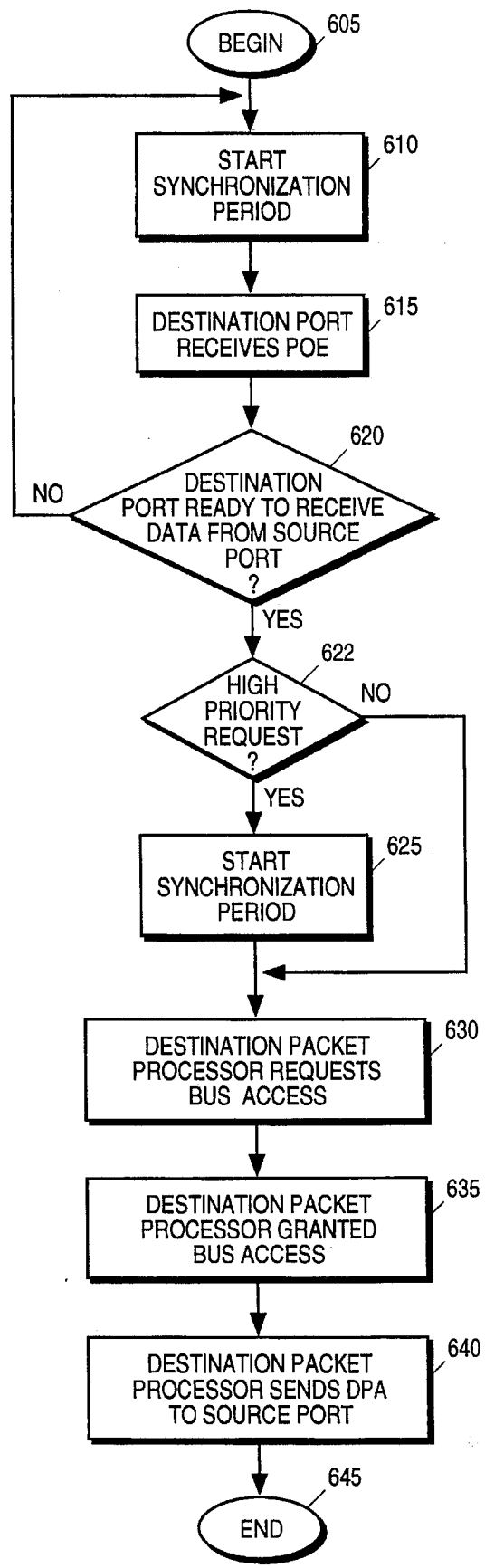
FIG. 6 is a flow chart showing uniport port arbitration method as performed by a destination packet processor.

FIG. 6 is a flow diagram showing the port arbitration process of a packet processor at the destination port. The process begins at process block 605. After a synchronization period has begun at process block 610, the destination port receives the POE mask, source ID and rate information from the source port at process block 615. The POE ma is received by the destination port in the same synchronization period that it is sent by the source port. If the destination port is ready to receive a system packet from the source port, the destination packet processor latches the source ID of the source port as indicated by the SID[4:0] signal lines. The destination packet processor continues to store the source ID of a source port until the last data word of the system packet is received as indicated by the TYPE[4:0] signal lines signaling EOP/CRC good or EOP/CRC bad. The destination packet processor compares the source ID of the data driven on the data bus to the latched source ID and accepts the data only if the two source ID's match. The destination packet processor clears its latch after receiving the last word of a system packet so that it may latch the source ID the next source port to be serviced.

At step 620, if the destination packet processor is not ready to receive data from the source port, the source port sends POE mask once per synchronization period and process blocks 610 and 615 are repeated until the destination packet processor is ready to receive data from the source port. If the destination packet processor is ready to receive data, and the system packet is a high priority packet as determined at process block 622, the destination packet processor waits for the beginning of the subsequent synchronization period at process block 625 before requesting bus access at process block 630. If the system packet is a low priority packet as determined at process block 622, the flow may proceed directly to process block 63 without awaiting for the beginning of the next synchronization period. At process block 635, the destination packet processor is granted bus access, and the destination packet processor sends the DPA signal to the source port at process block 640. The process ends at process block 645.

Figure 7:
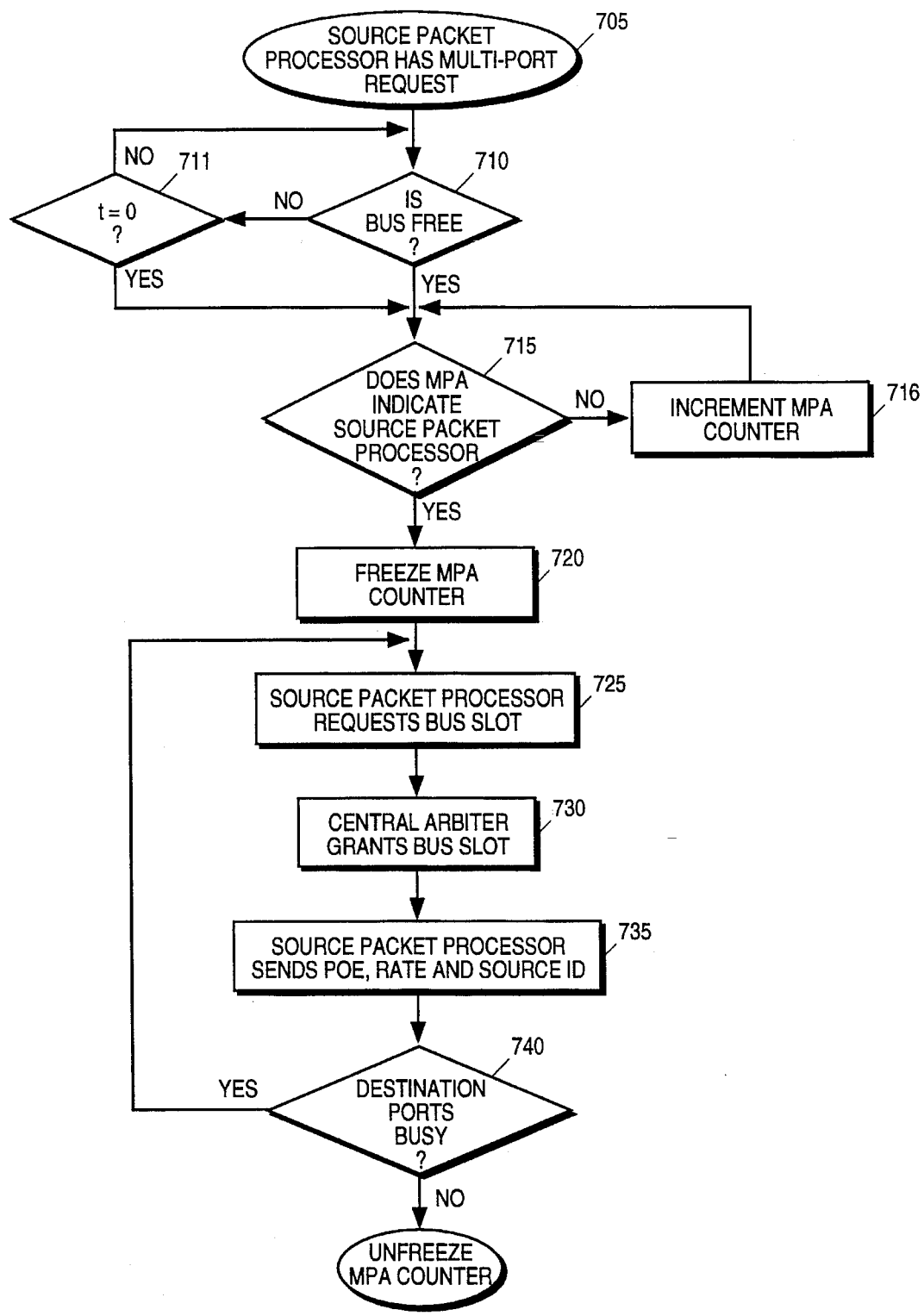
FIG. 7 is a flow chart showing one method for multiport arbitration.

FIG. 7 is a flow diagram showing a multiport switching bus arbitration method. At process block 705, a source port has received and identified a multicast or broadcast frame and thus a multiport arbitration request. The source packet processor may optionally monitor the BFREE signal line at process block 710 to determine if uniport port arbitration has completed. The BFREE signal line is asserted if a port that has asserted a POE mask has not received a return DPA signal, which signals the end of uniport port arbitration. If the bus is free at process block 710, the source packet processor may begin multiport port arbitration once the MPA[4:0]signal lines indicate the source packet processor. If the bus is not free at process block 710, the source packet processor may nonetheless begin multiport port arbitration if an internal timer of the source packet process times out (at time t=0) at process block 711.

At process block 715, if the MPA[4:0] signal lines do not indicate the source packet processor, the MPA counter is incremented at process block 716 to select a different packet processor. According to one embodiment, the MPA counter is incremented once every two bus clock cycles. If the MPA[4:0] signal lines indicate the source packet processor, the source packet processor begins multiport arbitration by freezing the MPA counter 213 at its current value. This occurs at process block 720. The MPA counter 213 nay be frozen by asserting the $\overline{\text{BFREEZ}}$ signal line. All packet processors of the switching fabric circuit assert the $\overline{\text{BBUSY}}$ line upon detection of the $\overline{\text{BFREEZ}}$ signal going active.

Once the source packet processor has asserted the $\overline{\text{BFREEZ}}$ signal, the source packet processor is free to request a bus slot with which to send the POE mask for the multiport packet. The source packet processor performs normal switching bus arbitration to send the multiport POE mask. If the multiport transaction is a high priority transaction, the source packet processor may have to wait until the start of the next synchronization period to make its request. If the multiport transaction is a low priority transaction, the source packet processor may request bus access anytime after high priority traffic has completed. The request is made at process block 725, and the central arbiter grants the source packet processor a bus slot at step 730.

The source packet processor sends the POE of the multiport system packet at process block 735. Packet processors that are not destinations of the multiport packet and destination packet processors of the multiport system packet that are not busy deassert the $\overline{\text{BBUSY}}$ signal. Destination packet processors that are not busy latch the source ID carried on the MPA[4:0] signal lines. This prevents destination packet processors that are not busy during one synchronization period from becoming busy in a subsequent synchronization period. If one or more destination packet processors are not ready to receive data at process block 740, the source packet processor repeats process blocks 725–735 once every synchronization period until all destination packet processors are ready to receive the multiport packet. When all destination packet processors are ready, the $\overline{\text{BBUSY}}$ signal is deasserted. At process block 745, the source packet processor desserts the $\overline{\text{BFREEZ}}$ signal high in response to $\overline{\text{BBUSY}}$ being deasserted, and the destination packet processors latch the value carried by the MPA[4:0] signal lines to use as the source ID of the source packet processor. Multiport port arbitration is complete, and the MPA counter 213 may be incremented a bus clock cycle after $\overline{\text{BFREEZ}}$ goes high. The transfer of the multiport packet then continues as if it were a uniport packet, which is shown in process blocks 535–560 of FIG. 5. Multiport arbitration may begin again before transfer of the multiport packet is completed.

Figure 8:
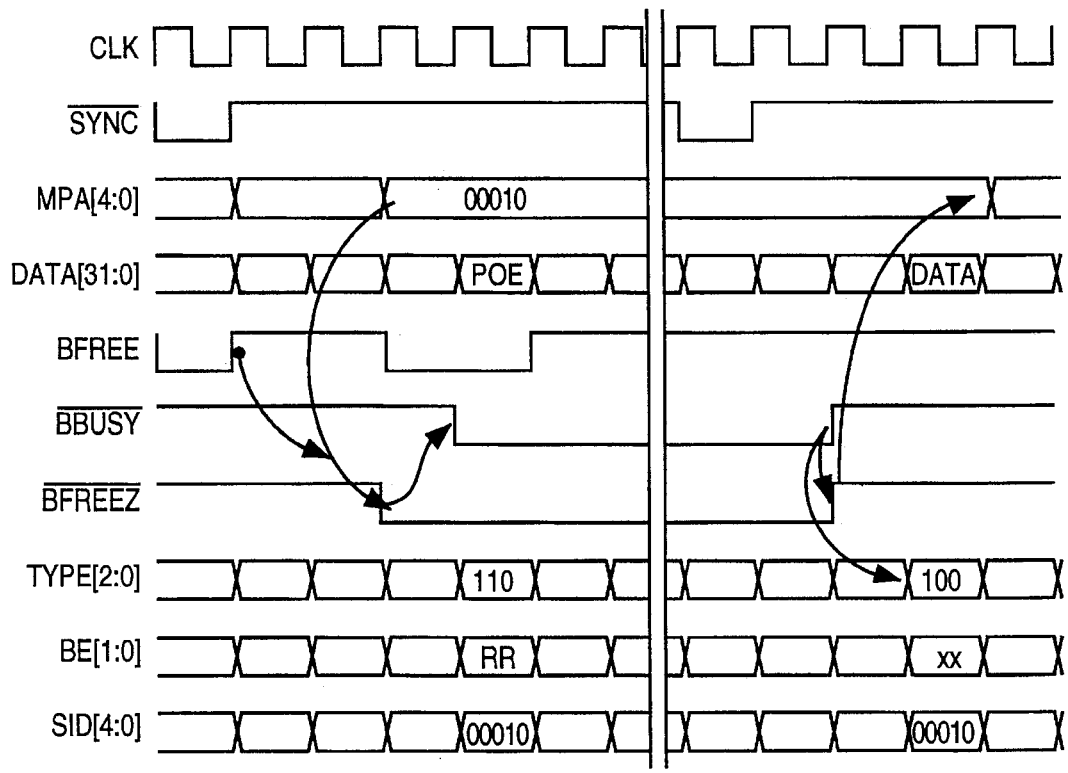
FIG. 8 is a timing diagram showing multiport arbitration according to the method shown in FIG. 7.

FIG. 8 shows an example of multiport arbitration according to the method shown in FIG. 7. The duration of the synchronization period is reduced to simplify the example. A first synchronization period begins when the $\overline{\text{SYNC}}$ signal goes low for one bus clock cycle. The MPA counter is incremented once every two bus clock cycles, as indicated by the MPA[4:0] signal lines. At the fourth bus clock cycle, the MPA counter is incremented, indicating port 2 in binary "00010." Port 2 has a multiport packet to transfer and freezes the MPA counter 213 during the fourth bus clock cycle by asserting the $\overline{\text{BFREEZ}}$ signal, and the BFREE signal goes low. During the fifth bus clock cycle, all the packet processors of the switching fabric circuit respond to $\overline{\text{BFREEZ}}$ going low by asserting $\overline{\text{BBUSY}}$, and the source packet processor drives the POE mask on the data bus. During the sixth bus clock cycle, BFREE goes high and packet processors that are either not addressed by the multiport packet or are destination packet processors ready to receive the multiport packet deassert the $\overline{\text{BBUSY}}$ line. As shown, some of the destination packet processors are busy such that $\overline{\text{BBUSY}}$ remains low. For subsequent synchronization periods, the source packet processor continues to send the multiport POE mask until all destination ports are ready to receive the multiport packet.

FIG. 8 shows two vertical lines that indicate the passage of time until the synchronization period after all destination packet processors have signaled their readiness to receive the multiport packet by deasserting $\overline{\text{BBUSY}}$. As shown, the $\overline{\text{BFREEZ}}$ signal goes inactive in response to the $\overline{\text{BBUSY}}$ signal going inactive, and the MPA counter 213 is enabled to begin incrementing in response to the $\overline{\text{BFREEZ}}$ signal going inactive. The transfer of the multiport packet may proceed similarly to the transfer of uniport packets as shown in FIG. 4.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. A switching fabric circuit comprising:
   a plurality of ports each coupled to a corresponding one of a plurality of local area network (LAN) segments;
   a switching link coupled to the plurality of ports for receiving requests for data transfer operations from the plurality of ports during a synchronization period, for prioritizing the requests for data transfer operations according to a high priority and a low priority during the synchronization period, and for granting requests for data transfer operations such that ports requesting data transfer operations at the high priority are guaranteed access to the switching link during the synchronization period, and such that ports requesting data transfer operations at the low priority are provided access to the switching link for a remainder of the synchronization period.

2. The switching fabric circuit of claim 1, wherein the switching link further comprises:

a switching bus;

a plurality of packet processors each coupled to a corresponding one of the plurality of ports and to the switching bus, the plurality of packet processors for receiving data frames from the LAN segments via the ports, for requesting access to the switching bus at one of the high priority and the low priority, and for transferring data to other packet processors via the switching bus when access to the switching bus is granted; and a central arbiter coupled to the switching bus, the central arbiter for receiving requests to access the switching bus, for granting access to the switching bus to all packet processors that request high priority accesses during the synchronization period in which the requests are received, and for granting bus access to packet processors that request low priority accesses during the remainder of the synchronization period.

3. The switching fabric circuit as claimed in claim 2, wherein each of the LAN segments transfers data according to one of a plurality of transfer rates and wherein high priority is assigned to data transfer operations between ports coupled to LAN segments that have a lowest transfer rate.

4. The switching fabric circuit as claimed in claim 2, wherein the synchronization period is subdivided into a plurality of bus slots and wherein each high priority data transfer operation is provided one bus slot per synchronization period.

5. The switching fabric circuit as claimed in claim 2, wherein the switching bus comprises:

a data bus for transmitting data during a bus slot;

type signal lines for indicating a data type transmitted by the data bus during the bus slot; and source signal lines for indicating a source port of the data transmitted by the data bus during the bus slot.

6. The switching fabric circuit as claimed in claim 5, wherein each packet processor includes circuitry for determining whether a particular data transfer operation is high priority or low priority.

7. A method for transferring data between ports of a switching fabric circuit wherein a first plurality of ports is coupled to local area network (LAN) segments that transfer data at a first rate and a second plurality of ports is coupled to LAN segments that transfer data at a second rate, the method comprising the steps of:

indicating a start of a synchronization period;

requesting high priority access to a bus of switching fabric circuit by at least one of a plurality packet processors coupled to the first and second plurality of ports and the bus;

granting all high priority access requests the synchronization period;

requesting low priority access to the bus by at least one of the plurality of packet processors coupled to the first and second plurality of ports after all high priority access request have been granted;

granting low priority access requests for the remainder of the synchronization period; and indicating a start of a new synchronization period by the central arbiter of the switching fabric circuit.

8. The method of claim 7, wherein each synchronization period is divided into a plurality of bus slots, each bus slot having a duration of a bus clock cycle, the method further comprising the steps of:

transferring data on the bus for one bus slot by each packet processor that has been granted a high priority access; and transferring data on the bus for at least bus slot by a packet processor that has been granted a low priority access.

9. The method of claim 7, wherein each synchronization period is divided into a plurality of bus slots, each bus slots having a duration of a bus clock cycle, the method further comprising the steps of:

initially allocating each packet processor a bus slot for transferring data; deallocating the bus slots for packet processors that do not request high priority access requests;

organizing the bus slots for high priority to be contiguous;

transferring data on the bus for one bus slot by each packet processor that has been granted a high priority access; and transferring data on the bus for at least one bus slot for a packet processor that has been granted a low priority access.

10. A method for forwarding a multiple destination packet in a switching link of a switching fabric circuit, comprising the steps of:

monitoring a bus of the switching link by a plurality of packet processors coupled to the bus;

selecting a first packet processor to transmit the multiple destination packet;

indicating via the bus that the first packet processor is selected to transmit the multiple destination packet during a synchronization period;

indicating by the first packet processor that the first packet processor has the multiple destination packet to transfer during the synchronization period;

transmitting a port of exit mask on the bus by the first packet processor, the port of exit mask indicating which of the plurality of packet processors are destination packet processors for the multiple destination packet;

indicating by the destination packet processor that the destination packet processors are ready to receive the multiple destination packet; and transmitting the multiple destination packet via the bus by the first packet processor during the synchronization period.

11. The method of claim 10, wherein the step of selecting the first packet processor comprises the step of incrementing a counter, wherein a count of the counter indicates one of the plurality of packet processors.

12. The method of claim 11, further comprising the step of stopping the counter in response to the first packet processor indicating that it has the multiple destination packet to transfer such that the count continues to indicate the first packet processor.

13. The method of claim 12, further comprising the step of incrementing the counter in response to the destination packet processors indicating that they are ready to receive the multiple destination packet.

14. A method for transferring a data packet comprising the steps of:

requesting control of a bus by a first port to transfer the data packet during a synchronization period;

granting control of the bus to the first port by a central arbiter;

transferring destination information by the first port via the bus during the synchronization period, the destination information indicating a second port as a destination of the data packet;

requesting control of the bus by the second port in response to receiving the destination information;

granting control of the bus to the second port by the central arbiter;

transferring information by the second port via bus indicating to the first port that the second port is ready to receive the data packet; and requesting access of the bus by the first port to transfer the data packet to the second port during the synchronization period.

15. The method of claim 14, further comprising the step of transferring a source identification by the first port to the second port simultaneous with the step of transferring destination information by the first port, wherein the source identification indicates the first port as a source of the destination information.

16. The method of claim 15, further comprising the step of transferring the source identification by the second port to the first port simultaneous with the step of transferring information by the second port.

* * * * *